United States Patent
Parikh et al.

(10) Patent No.: US 12,524,479 B2
(45) Date of Patent: *Jan. 13, 2026

(54) CONTENT SUMMARIZATION AND/OR RECOMMENDATION APPARATUS AND METHOD

(71) Applicant: Intel Corporation, Santa Clara, CA (US)

(72) Inventors: Nirmit Parikh, San Jose, CA (US); Tanmay Hiren Desai, Navsari (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,020

(22) Filed: Jul. 31, 2024

(65) Prior Publication Data

US 2024/0394316 A1    Nov. 28, 2024

Related U.S. Application Data

(63) Continuation of application No. 16/893,961, filed on Jun. 5, 2020, now abandoned, which is a continuation of application No. 14/171,674, filed on Feb. 3, 2014, now Pat. No. 10,691,737.

(60) Provisional application No. 61/761,113, filed on Feb. 5, 2013.

(51) Int. Cl.
*G06F 16/00* (2019.01)
*G06F 16/34* (2019.01)
*G06F 16/9535* (2019.01)
*G06F 16/9536* (2019.01)

(52) U.S. Cl.
CPC ........ *G06F 16/9535* (2019.01); *G06F 16/345* (2019.01); *G06F 16/9536* (2019.01)

(58) Field of Classification Search
CPC .................................................. G06F 16/9535
USPC ........................................................ 707/748
See application file for complete search history.

(56) References Cited

U.S. PATENT DOCUMENTS

| | | |
|---|---|---|
| 5,924,108 A | 7/1999 | Fein et al. |
| 7,185,001 B1 | 2/2007 | Burdick et al. |
| 7,743,399 B1 | 6/2010 | Bhagavath et al. |
| 7,788,261 B2 | 8/2010 | Hoeber et al. |
| 8,719,283 B2 | 5/2014 | Koski |
| 10,133,812 B2 * | 11/2018 | Lee ........................ G06F 16/335 707/707 |

(Continued)

OTHER PUBLICATIONS

Final Office Action from U.S. Appl. No. 14/171,674 notified Apr. 11, 2016, 19 pgs.
Final Office Action from U.S. Appl. No. 14/171,674 notified Jan. 26, 2018, 9 pgs.
Final Office Action from U.S. Appl. No. 16/893,961 notified May 8, 2024, 11 pgs.
Final Office Action from U.S. Appl. No. 16/893,961 notified Feb. 14, 2022, 9 pgs.

(Continued)

*Primary Examiner* — Alexandria Y Bromell

(74) *Attorney, Agent, or Firm* — Essential Patents Group, LLP; Christopher K. Gagne

(57) ABSTRACT

Embodiments are provided for summarization and recommendation of content. In disclosed embodiments, a summarization engine scores constituent parts of content, and generates a plurality of summaries from a plurality of points of view for the content based at least in part on the scores of constituent parts. The summaries may be formed with constituent parts extracted from the contents. A recommendation engine provides recommendations to a user based on rankings of the summaries generated by the summarization engine. Other embodiments may be described and/or claimed.

28 Claims, 11 Drawing Sheets

(56) References Cited

U.S. PATENT DOCUMENTS

| | | |
|---|---|---|
| 2002/0078090 A1 | 6/2002 | Hwang et al. |
| 2004/0133560 A1 | 7/2004 | Simske |
| 2005/0022106 A1 | 1/2005 | Kawai et al. |
| 2005/0234709 A1 | 10/2005 | Klavans et al. |
| 2005/0262214 A1 | 11/2005 | Bagga et al. |
| 2006/0047656 A1 | 3/2006 | Dehlinger et al. |
| 2006/0167930 A1 | 7/2006 | Witwer et al. |
| 2007/0171303 A1 | 7/2007 | Barbieri et al. |
| 2007/0245379 A1 | 10/2007 | Agnihortri |
| 2008/0109399 A1 | 5/2008 | Liao et al. |
| 2009/0041356 A1 | 2/2009 | Barbieri et al. |
| 2009/0157656 A1 | 6/2009 | Chen et al. |
| 2011/0153423 A1 | 6/2011 | Elvekrog et al. |
| 2012/0166180 A1 | 6/2012 | Au |
| 2012/0210203 A1 | 8/2012 | Kandekar et al. |
| 2013/0138696 A1 | 5/2013 | Turdakov et al. |
| 2013/0254035 A1* | 9/2013 | Ramer ............... G06Q 30/0267 705/14.62 |
| 2013/0275320 A1 | 10/2013 | Moore et al. |
| 2014/0156681 A1 | 6/2014 | Lee et al. |
| 2020/0118035 A1 | 4/2020 | Asawa et al. |

OTHER PUBLICATIONS

Final Office Action from U.S. Appl. No. 16/893,961 notified Jun. 8, 2023, 10 pgs.
Non-Final Office Action from U.S. Appl. No. 14/171,674 notified Aug. 24, 2017, 25 pgs.
Non-Final Office Action from U.S. Appl. No. 14/171,674 notified Dec. 18, 2015, 21 pgs.
Non-Final Office Action from U.S. Appl. No. 14/171,674 notified Jan. 31, 2017, 20 pgs.
Non-Final Office Action from U.S. Appl. No. 16/893,961 notified Aug. 18, 2021, 7 pgs.
Non-Final Office Action from U.S. Appl. No. 16/893,961 notified Feb. 1, 2023, 8 pgs.
Non-Final Office Action from U.S. Appl. No. 16/893,961 notified Jul. 21, 2022, 9 pgs.
Non-Final Office Action from U.S. Appl. No. 16/893,961 notified Sep. 27, 2023, 10 pgs.
Notice of Allowance from U.S. Appl. No. 14/171,674 notified Feb. 26, 2020, 11 pgs.
Non-Final Office Action from U.S. Appl. No. 18/799,762 notified Apr. 24, 2025, 32 pgs.

* cited by examiner

CONTENT SUMMARIZATION AND/OR RECOMMENDATION APPARATUS AND METHOD

CLAIM OF PRIORITY

This application is a continuation of prior U.S. patent application Ser. No. 16/893,961, filed on Jun. 5, 2020 and titled "CONTENT SUMMARIZATION AND/OR RECOMMENDATION APPARATUS AND METHOD," which is a continuation of prior U.S. patent application Ser. No. 14/171,674, filed on Feb. 3, 2014 and titled "CONTENT SUMMARIZATION AND/OR RECOMMENDATION APPARATUS AND METHOD," now issued as U.S. Pat. No. 10,691,737 on Jun. 23, 2020, which claims priority to prior U.S. Provisional Application No. 61/761,113, filed on Feb. 5, 2013. Each of these prior applications is hereby incorporated herein by reference in its entirety.

TECHNICAL FIELD

The present disclosure relates to the summarization and recommendation of content. More particularly, the present disclosure relates to improved summarization of online/offline content to provide dynamic summaries from a plurality of points of view, as well as ranking of summaries and recommendation of content based at least in part on the ranked summaries.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The resources available to a user online are ever expanding. More websites, blogs, self-publishing and the like increases the amount of information online exponentially. Facebook™M users create 45 million status updates each day and Twitter™ has about 5 million tweets. Even though blogs are on the decline since the advent of social media some 900,000 new blog articles are written every day. This is no small number in fact if those articles were taken alone it would be enough content to fill the pages of the New York Times™ for 19 years. Source: OnlineEducation.net.

For example, when a user does an online search, such as using GOOGLE™, hundreds of links to articles of interest may be presented according to some formula or ranking. The user would then have to review the articles on every link for desired information. As the amount of online content increases, the number of useless or marginally useful articles increases so that the user wastes considerable time surfing the links only to find nothing of value is presented. Searched terms may be highlighted along with text, but many times this also is not helpful. Moreover, offensive or crude material may be highlighted that offends the user.

Current search engines also may provide summaries of articles to help users. These summaries, however, are from only one point of view, if any at all. The summaries find matching terms and highlights text around the term without taking into account context or other terms that are emphasized in the article. Finally, search engines may be tricked into highlighting links that have nothing to do with the desired search by adding superfluous terms and bogus tags only to rank high on a list. Companies may pay to have their articles rank high even without any regard for the actual content. All of these situations result in wasted time reviewing articles and content online that does little to help a user in finding information of interest. As a result, search engines may start to fail as effective tools to identify and review articles online.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
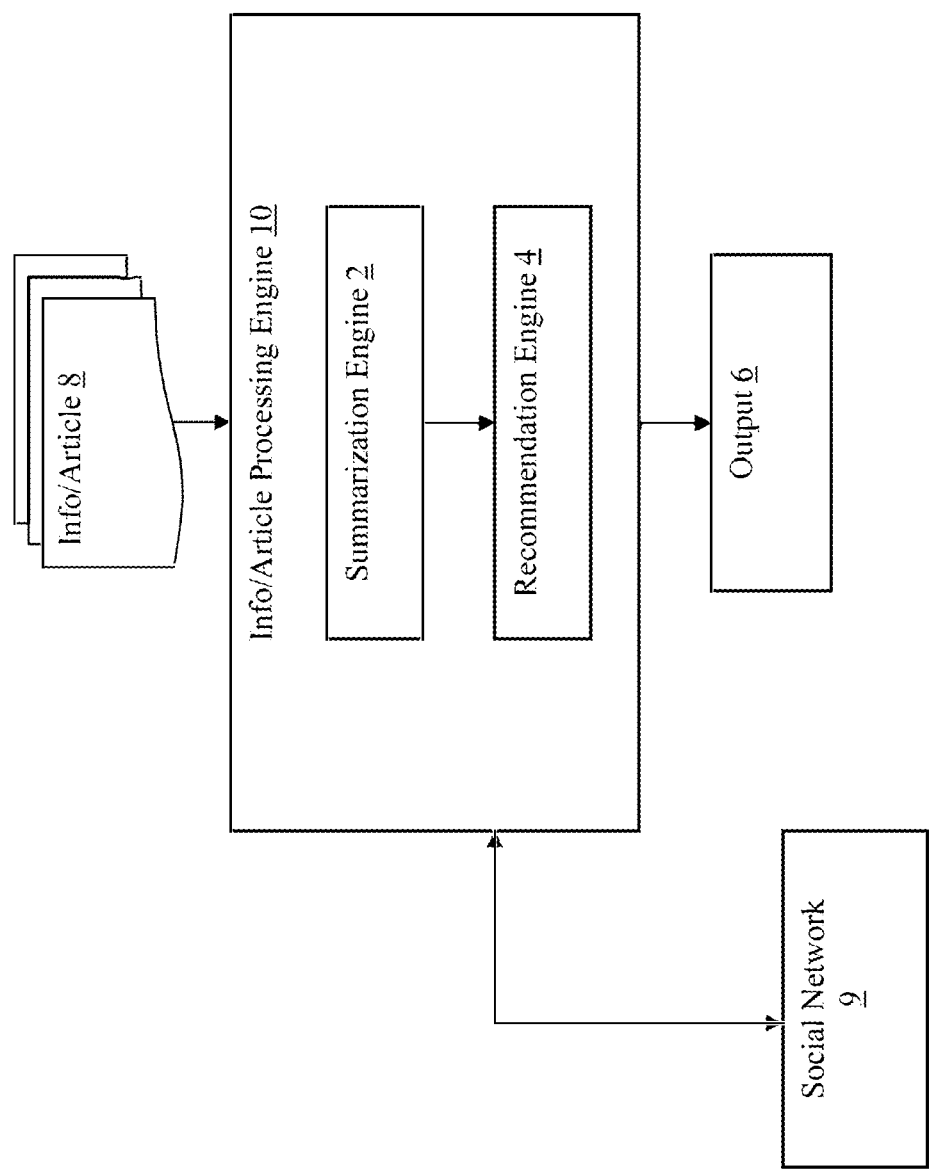
FIG. 1 illustrates a block diagram of a content processing engine according to the disclosed embodiments.

Disclosed embodiments provide a content processing engine that reviews online or offline content to dynamically recreate a summary or a plurality of summaries from different points of view. Online/offline content may include webpages, articles, documents, audios, videos, and so forth (hereinafter, generally referred to as an "article" or "articles"). An article may be converted into a node with links to other articles/nodes to create a collection of interconnected/linked articles/nodes, using the disclosed processes and engines. A user may get out of the articles what are important from their summaries, as opposed to wading through a lot of content.

The disclosed content processing engine may summarize an article using one or more of four methods (e.g., natural language processing (NLP) techniques) to provide score or scores for the article. These methods may include a graph method, a document title words and keywords method, a "parts of speech" (POS) tagging method, and a heuristic method. The methods may be used in parallel or in a selective manner to score constituent parts of the articles, such as, key words, key phrases, sentences of the articles (captions/transcripts in the case of audios/videos), and in turn, the articles. The resulting summary may be an extraction-based summary as opposed to an abstraction-based summary. Keywords and terms may be presented to the user online or offline with the article, as well as terms are available for different points of view.

Once the article or articles are summarized, an artificial brain may be created online. All articles may be pushed to the content processing engine to read the articles for the user. The content processing engine can find related articles to suggest to the user. Thus, the content processing engine may serve as a recommendation engine for online content to the user based on activity on the engine.

The disclosed content processing engine also may support a social network based on topics or reading/browsing interest. Future search engines may fail, as the content in the web is increasing at exponential level. The disclosed content processing engine understands both passive and active interests of the user based on searches and summaries of articles. With the disclosed content processing engine, the user can follow what other people of similar interests are reading and can get human filtered information. Alternatively, the users can also get connected to each other. The terms and keywords identified for articles may be linked within this network to provide availability to online content.

The disclosed content processing engine may work on online and offline content. It can summarize cluttered content as well as extracted content or simple text input. The disclosed content processing engine can pull content from online resources and locations, as well as from a database/storage that is local, or from a server. The content may be in an electronic format.

Thus, there may be two entry points to the disclosed content processing engine. One is online/offline cluttered pages. Text is extracted from these pages and summarized, and clutters are removed, as disclosed below. Another is online/offline extracted text. These content are summarized directly by engine as it is clutter-free. There is no need to extract.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 depicts a content processing engine 10 according to the disclosed embodiments. The content processing engine utilizes statistical and linguistic ontology and various machine learning (ML) techniques to process content. The content processing engine 10 may be implemented as an artificial brain. Here, an "artificial brain" refers to a computing system (including hardware and software elements), or network of computing systems, configurable or operable to simulate or emulate a human brain (or human mind) using artificial intelligence (AI) and/or ML techniques. Such techniques may include, for example, using artificial neural networks (NNs), which involve computing systems computing ML models that are inspired by biological NNs. The NNs may be arranged into any suitable of topology or architecture, such as a Feed forward NN (FNN), Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), among many others.

As shown, in embodiments, content processing engine 10 may be configured to receive online information and articles 8, or offline/local/database information or article, e.g., through some interaction with a user or another program, such as a browser, word processor, and so forth, with which the user interacts. The user may, e.g., select the articles from a returned list of links to the articles after running a search on a search engine. The articles may reside in electronic form online, or offline/local/database information or article, which enable content processing engine 10 to mine data from the articles. As described earlier, articles 8 may include webpages, documents, audio and/or video clippings.

Content processing engine 10 may include a summarization engine 2, disclosed in greater detail below. Summarization engine 2 may review an article, or any online content, and analyze the content/text for various properties and characteristics. Summarization engine 2 then may score the article, and the sentences/text within the article (or its captions/transcripts in the case of audios/videos) so that the main points, or "gist," of the article (keywords, phrases or sentences in the case of text, segments in the case of audio/video) may be extracted and made available to the user.

Recommendation engine 4 may receive results from summarization engine 2, as well as information from the user, and use the results to recommend articles or other online content to the user. In a way, recommendation engine 4 may act as an artificial online brain that selects articles and information of interest to the user based on the efforts of summarization engine 2. For example, the user reads an article which says x=y and then after some days reads another article which says y=z. A brain correlates x=z, thanks to information overload, the user just cannot read everything. So once the user reads an article, recommendation engine 4 may store the correlations and may correlate a new article to the user for a recommendation. Recommendation engine 4 will be further described with references to FIG. 10, in conjunction with the description of a user behavior identification system, referencing FIG. 3.

Further, content processing engine 10 also may interact with social network 9. In the future, the search engines may fail as the content in the web increases at an exponential level. Content processing engine 10 may be configured to understand both passive and active interests. With content processing engine 10, people can follow content interaction of other people of similar interests, such as what they are reading, sharing, and so forth, and can get human filtered information by making people the sensors of information. Interaction with social network 9 will be further described later with references to FIGS. 7 and 8.

Depending on what functions are used within content processing engine 10, it may provide an output 6 to the user. Output 6 may be a summary of the article, a list of keywords, the article itself, a ranking of articles, a recommended article, and the like (or links to the summary, the list, et al). Summary of an article may be of a selected point of view, and may change when a different point of view is selected. As described earlier, in embodiments, summaries may be extraction summaries. However, in alternate embodiments, abstract summaries may also be provided. In embodiments, output 6 may be displayed on a screen of a computing device, or can be stored to a database/software/cache/flash memory/other physical storage medium, of any electrical, magnetic, optical or solid state type. The computing device may be any one of a smartphone, a phablet, a computing tablet, a laptop or desktop computer, a game console, and so forth, communicatively coupled with content processing engine 10, or on which the content processing engine 10 may be installed.

Figure 2:
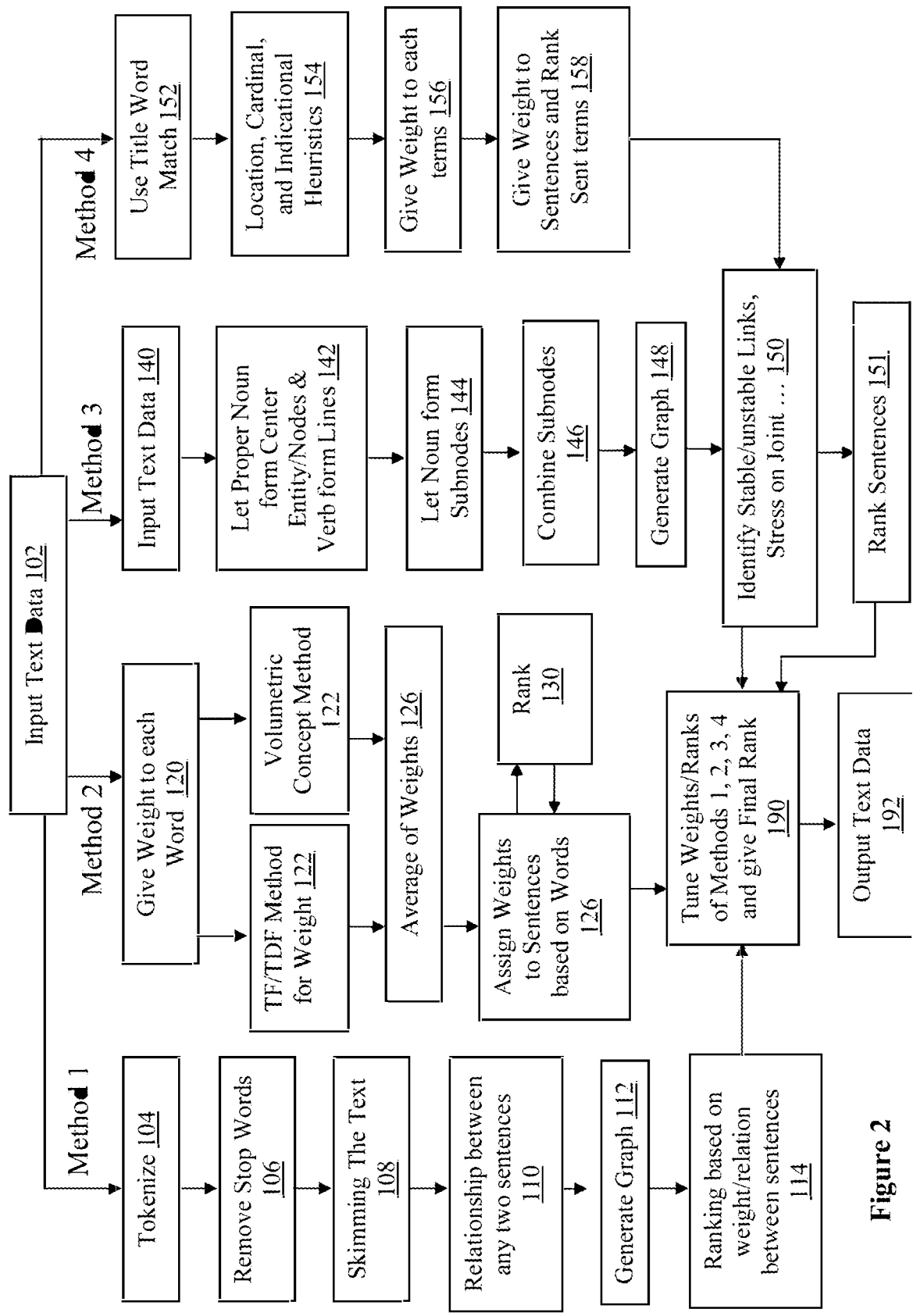
FIG. 2 illustrates a flow diagram for the summarization engine of FIG. 1 according to the disclosed embodiments.

FIG. 2 depicts a flow diagram 100 for a summarization engine 2 of content processing engine 10 in further detail, according to the disclosed embodiments. The summarization engine 2 may provide scores for articles applying one or more of a plurality of processing methods to score the articles. Further, in embodiments, nodes and links may be used, by summarization engine 2, to determine keywords within the articles and points of view for a user to select (or by recommendation engine 4 to use to suggest a viewpoint e.g., based on a user's profile, to be described more fully below). At operation 102 text data from the online articles, or offline/local/database information or articles, may be inputted or received into content processing engine 10. Additionally, in embodiments, clutters, such as advertisements, may be removed before the one or more processing methods are applied to score the articles.

The first method, performed by summarization engine 2, may relate to a graph method that provides a rank to each sentence based on the coherence of roots of words between sentences. Thus, the first method may determine a relation how each sentence is connected with another sentence. Operation 104 may include tokenizing, or chunking (joining) of related sentences based on rules. The rules may be used to identify keywords and terms between the sentences. The rules are presented below along with examples. The rules may be applied sequentially in any order.

Rule 1 may be related to determining the presence of connectives, such as accordingly, again, also, besides, and the like. The presence of a connective in a sentence indicates a connection to the previous sentence. When such connectives are found, the adjacent sentences may form coherent chunks within the online article, or offline/local/database information or article. The implementation of Rule 1 may be seen in the following examples.

EXAMPLE 1

1. The train was late.
2. However, I managed to reach the wedding on time.

In example 1, the connecting word "however" may be used to bind its sentence with the situation specified in the first sentence of the train being late.

EXAMPLE 2

1. The cab driver was late.
2. The bike tire was punctured.
3. The train was late.
4. Finally, I managed to arrive at the wedding on time by calling a cab.

The connecting word "finally" may be used to bind its sentence with the situation of the author being delayed.

EXAMPLE 3

1. The cab driver was late.
2. The bike tire was punctured.
3. The train was late.
4. I could not wait any longer, so I finally managed to reach the wedding on time by calling a cab The connecting word "finally," though it comes in the middle of the sentence, may still be used to bind its sentence with the situation of the author being delayed.

Rule 2 of the chunking operation may provide that a third person pronoun in a given sentence may be considered as referring to an antecedent term in a previous sentence. The given sentence provides complete meaning with respect to the previous sentence. When such adjacent sentences are found, these sentences may form coherent chunks.

EXAMPLE 4

1. Ravi is a good boy.
2. He always tells the truth.

The pronoun "he" in sentence 2 may be considered as referring to "Ravi" in the first sentence.

EXAMPLE 5

1. He is the one who got the first prize.

The pronoun "he" may be considered possessive, and thus, does not need an antecedent to give meaning to the sentence.

Rule 3 may establish that the reappearance of nouns in adjacent sentences is an indication of a connection. When such adjacent sentences are found, the sentences may form coherent chunks.

EXAMPLE 6

1. Ravi is a good boy.
2. Ravi scored good marks in exams.

EXAMPLE 7

1. The car race starts at noon.
2. Any car is allowed to participate.

Coherence and connectivity between the two sentences in each example is shown through reappearing nouns.

Rule 4 may establish that an ontology relationship between words across sentences may be used to find semantically related words in adjacent sentences that appear in an article. The appearance of related words may be an indication of coherence and forms coherent chunks. To find the semantic neighborhood between adjacent sentences, most of the lexical relationships, such as synonyms, hyponyms, hypernyms, homonyms, meronyms, holonyms and gradation may be used. Thus, semantically-related terms may be captured through this process.

EXAMPLE 8

1. The bicycle has two wheels.
2. The wheels provide speed and stability.

The bicycle and wheels are related as bicycle is the holonym of wheels.

All of the above rules may be applied incrementally to achieve complete sets of coherent chunks of sentences within the article.

Operation 106 may include removing stop words. In a sentence, words such as "the," "are," "a," "is," and the like do not give meaningful information about the article. These words may be removed from each sentence to only leave words important to the coherent chunks and sentences.

Operation 108 may include stemming, or skimming, the text. Words may be reduced to their stem roots to reduce redundant terms and to better identify similar terms between sentences. For example, words such as "lovely," "loving," "lovable," "loved," and the like refer to the root work "love." The disclosed embodiments stem these words to "love" so that it becomes easier to identify similarity between sentences in the article, and for use in later stages. Operation 110 may include calculating the relationship between any two sentences on the basis of overlap of stemmed words from operation 108.

Operation 112 may include generating a graph. In embodiments, nodes may be created in the graph for each sentence. The nodes may have a score and index for knowing which sentence that the node represents. The node may have relations with other nodes in the form of edges. The relations may have weight based on the similarity of the words in each sentence. The weight used may be empirical, and refined in view of feedbacks on usefulness of the outputs.

Operation 112 may include connecting the nodes within the graph. In embodiments, relations between nodes of the graph may be found based on the similarity between the words found in them. Stop words have been removed, as disclosed above, so the disclosed embodiments do not waste resources or time on finding the similarity of words such as "is," "the," and the like. If two root words in two sentences match, then a relation between their corresponding nodes may be given weight.

Operation 114 may include assigning scores to each node, or determining ranking based on weight/relation between sentences (nodes). During this operation, the disclosed embodiments may determine the number of relations that the node has with other nodes. The disclosed embodiments may add the weight of all these relations that the node has and the relations become the score of that node. The node with the maximum relations may have a higher score and more weight. Thereafter, the operations may proceed to operation 190, disclosed in greater detail below.

Method 2 performed by summarization engine 2 may relate to showing the density or the volumetric concentration of each word/entity/concept in the article. This method 2 may determine the title words and key phrases using term frequency-inverse document frequency (tf*IDF) values for each word of a sentence, as well as remove stop words and stemming. Thus, the disclosed embodiments may increase the score of sentences that include keywords and title words.

Operation 120 may include giving weight to each word in a sentence. Operation 122 may include using the tf*IDF method for determining a weight. Operation 124 may include using a volumetric concept method to determine a weight. Operation 126 may include averaging the weight values. Operation 128 may include giving weight to the sentence based on the words within. Operation 130 may include ranking the sentences according to the weights. Thereafter, operation may go to operation 190.

Method 2 may be illustrated by the following example. Suppose the title of an article is "Yuvraj Singh is suffering from cancer." The key phrases, or key words, of the article are "cricket" (weight=3), "Yuvraj Singh" (weight=6), and "cancer" (weight=5). A sentence may be "Yuvraj is suffering from cancer, which is curable and will probably travel to London for diagnosis." The sentence contains two key words: "Yuvraj" and "cancer." Thus, the disclosed embodiments may add the weights 6 and 5, or 11, to the score for that sentence.

Method 3 performed by summarization engine 2 may relate to tagging parts of speech, or "POS tagging," for words in each sentence. All of the nouns, proper and improper, may be used to form nodes. All the verbs, adjectives, and adverbs may be used to generate links between the nodes. The relationship will be indexed as well as name based on whether the words are verbs, adjectives or adverbs. Thus, operation 140 executes by starting POS tagging on the text data.

Operation 142 may include letting the proper noun form the center entity/nodes and the verbs for the lines between the nodes. Operation 144 may include letting nouns form subnodes, if applicable. Operation 146 may include using a dictionary database or thesaurus to combine subnodes. Operation 148 may include creating a graph.

An example of POS tagging may be shown using the following sentence: "Apple, Inc., is an American multinational corporation that designs and sells computer electronics, computer software and personal computers." The proper noun is "Apple, Inc." or just "Apple," which forms the center node of the resulting graph. "Corporation" may be a subnode along with the other nouns in the sentence-electronics, software and computers. The center node is connected to the subnodes by the verbs "is," "designs," and "sells." The verbs link the nodes to each other. Adjectives may act as leaves on the nodes. Stop words may be removed for less clutter on the graph.

Operation 150 may include identifying stable and unstable links based on the truss/mechanical stress on the joints. Operation 150 also may check for the longest possible path with the least nodes and the shortest path with the maximum nodes. Using method 3, the disclosed embodiments may create a knowledge network. Using content processing engine 100, the disclosed embodiments may utilize various machine learning techniques to compile all the information about the linked nodes for different entities. The disclosed embodiments may develop intelligently summaries from the document, thereby skipping the less important parts of a sentence and, at the same time, mentioning the most part. This graphing may occur for every sentence in the article, with nodes having a plurality of links coming and going.

After the graph is developed, the disclosed embodiments may identify the node with the maximum incoming and outgoing links. Thus, the identified node (noun) may be considered more important for the article. The disclosed embodiments also may eliminate the nodes having the least incoming and outgoing links. Operation 151 may include ranking sentences according to the scores of the sentences based on the sentences having nodes with more weight receiving a higher score.

Method 4 performed by summarization engine 2, as shown in FIG. 2, may relate to heuristic methods. Operation 152 may include performing a title word match to find sentences using title words. Operation 154 may include using location, cardinal and indicational heuristics to score sentences in the article. This operation will be described in greater detail below. For example, sentences containing quotes may have their score increased as quotes may be more important than sentences not having them. The score of sentences having special words in the beginning, such as "in short," "in conclusion," "thus," and the like, may be increased as well. Short sentences may have their score decreased. The location of the sentence in the articles also may influence its score. Depending on the type of article, then location may increase score. For example, in a news article, the first and last sentences may have an increase in score due to their perceived importance.

Operation 156 may include giving weight based on the heuristics to terms in the sentences. Operation 158 may include giving weight to sentences and ranking sentences. Thereafter, operation may go to operation 150, disclosed above.

Point of view summaries of articles may be provided according to the disclosed embodiments. When the user changes the point of view of the summary, the disclosed content processing engine may generate a summary increasing weight of that view keyword/key-entity. The increased weight may, e.g., be 150%. Thus, if the original weight of the keyword/key-entity is 10. If the point of view is changed by selecting that keyword/key-entity, its weight will become 15 while generating the point of view summary. This way, the disclosed embodiments may provide a summary which is inclined towards the user selected point of view.

Figure 3:
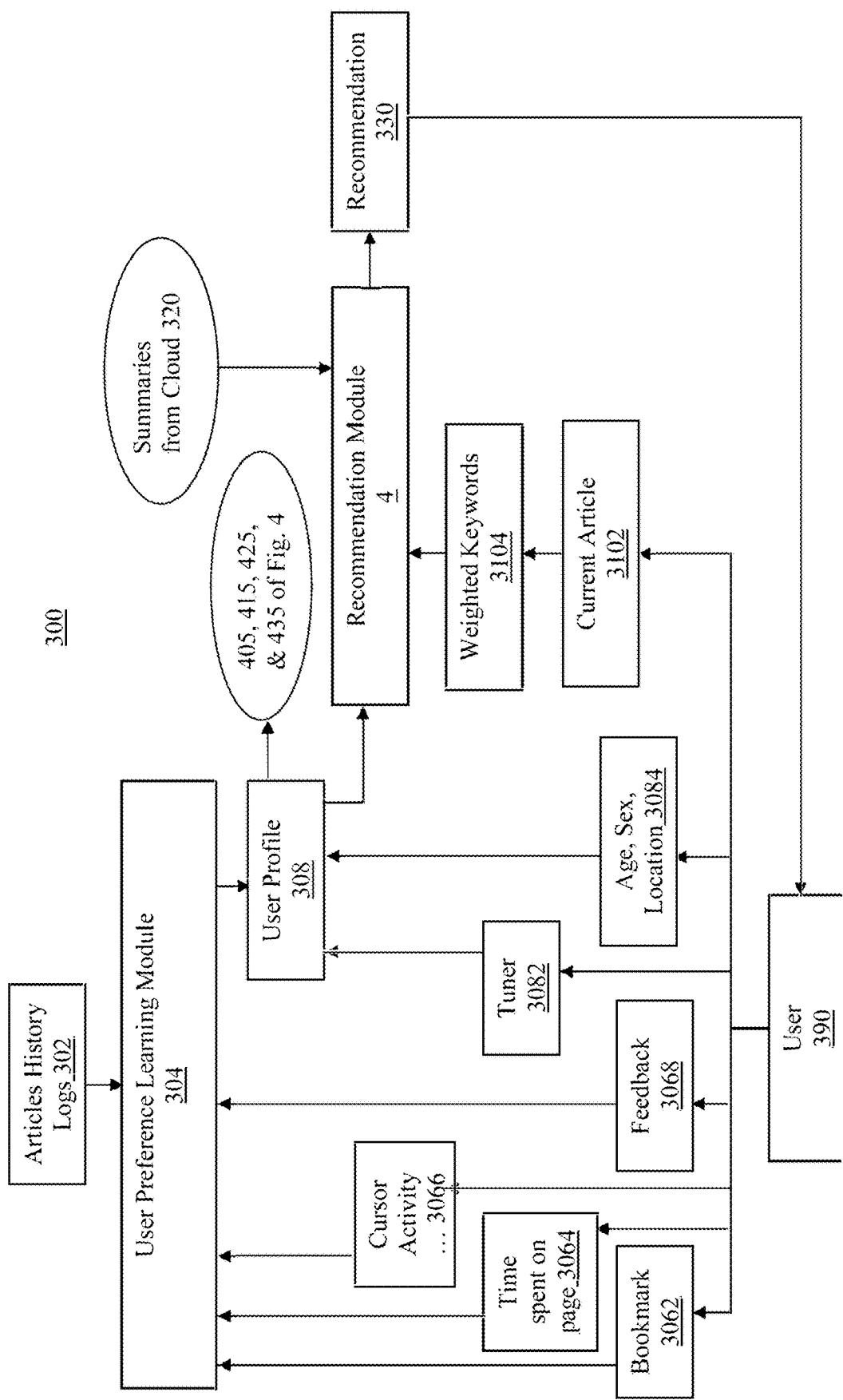
FIG. 3 illustrates a block diagram of a user behavior identification system according to the disclosed embodiments.
Figure 9:
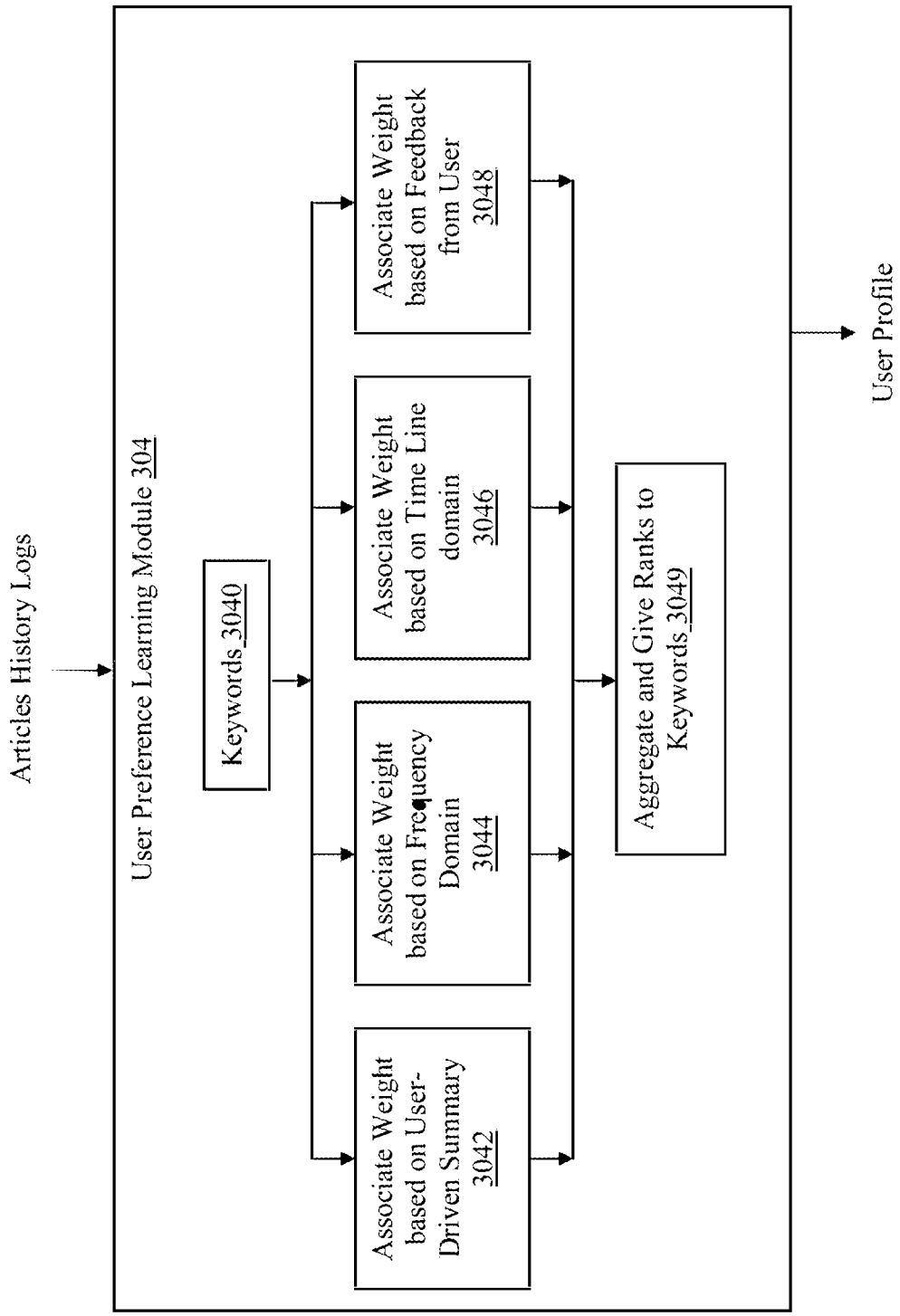
FIG. 9 illustrates the user preference learning module of FIG. 3 in further detail according to the disclosed embodiments.
Figure 10:
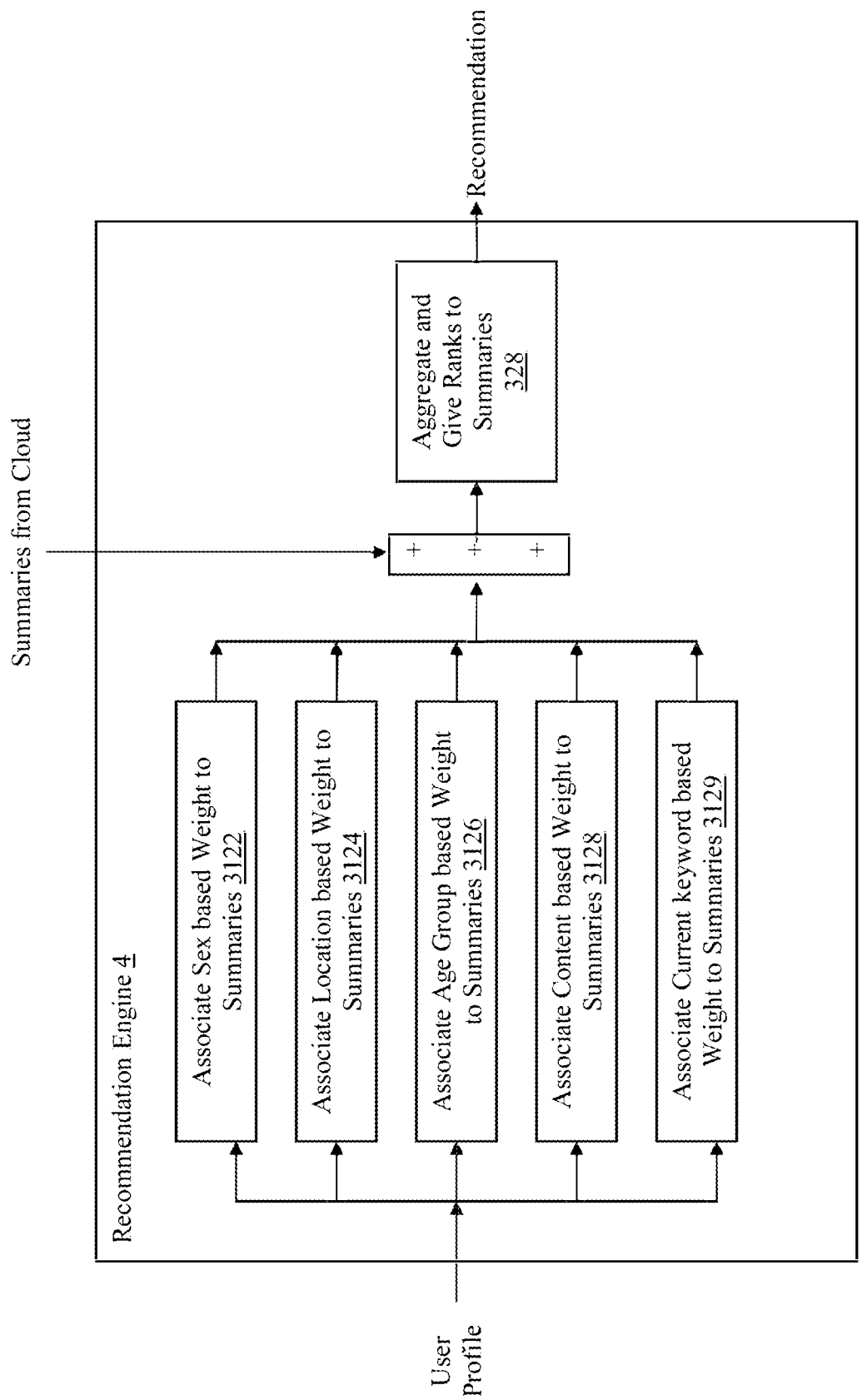
FIG. 10 illustrates the recommendation engine of FIGS. 1 and 3 in further detail according to the disclosed embodiments.

Referring now to FIGS. 3, 9 and 10. FIG. 3 depicts a block diagram of a user behavior identification system according to the disclosed embodiments. FIG. 9 depicts the user preference learning module of FIG. 3 in further detail according to the disclosed embodiments. FIG. 10 depicts the recommendation engine of FIGS. 1 and 3 in further detail according to the disclosed embodiments. As shown, recommendation engine 4, in addition to being suitable for use in combination with summarization engine 2 to form content processing engine 10, may be used for user behavior identification system 300, along with other components, such as user preference learning module 304, to recommend articles for user 390. Recommendation engine 4 may provide recommendations 330 to user 390 based on information derived from articles/history/log 302 (hereinafter "articles 302"), by user preference learning module 304. In embodiments, user behavior identification system 300 and the content processing engine 10 may each has its own recommendation engine 4 or share a common recommendation engine 4. In embodiments, user behavior identification system 300 and the content processing engine 10 may be co-installed, or communicatively coupled with each other over a network (e.g., with user behavior identification system 300 available as service to content processing engine 10).

In embodiments, as user 390 reads text, listen to audio or view video online, e.g., through an electronic word processor, a browser, and so forth, keywords and/or key phrases 3040 may be identified, as disclosed above, and fetched from the text, caption/transcript, and stored (along with other information, such as browsing history) in a history log 302 for that particular user, by user preference learning module 304. While logging keywords 3040, user search query keywords and keywords used by user 390 to change the point of view of a summary may also be noted. Likewise, time spent on a page also may be noted.

User precedence learning module 304, in embodiments, may receive these factors based on activities of user 390, as shown in FIG. 3. For example, bookmarks 3062, time 3064 that user 390 spends on a page, cursor activity/clicks 3066 on particular keywords, feedback 3068, and the like may be received and used within module 304 to provide aggregate and ranked keywords 3049.

Module 304, in embodiments, may give weight to every keyword 3040 using the factors. Associate weight 3042 may be given to keywords that were used by user 390 as search query or for user driven summary. Associate weight 3044 may be given to keywords that have more frequency within articles. Associate weight 3046 may be given based on the time-line domain, or those keywords that have been recently logged. Over time, in embodiments, the weight may decrease unless the keyword is used after a recent period. Further, in embodiments, keywords from an article that user 390 spends more time, or perform cursor activity, or bookmark, may receive more weight. Associate weight 3048 may be given based on a feedback 3068 from user 390. Feedback 3068 may be based on a rating system, such 1 to 5. Keywords of those articles, in embodiments, may get more weight.

Keywords 3040, in embodiments, along with rankings 3049, may be stored in user profile 308. For better recommendations, in embodiments, user 390 may further provide age, sex, location and the like information 3084 to user profile 308. User 390, in embodiments, also may use tuner 3082 to tune user profile 308 to delete/add/edit keywords 3040.

Recommendation engine 4, in embodiments, may consider user profile 308 and weighted keywords 3104 from current article 3102. Weighted keywords 3104 may be included so that keywords from the text, caption/transcript that user 390 is currently reading/viewing may be given more importance. Other information and data may be fed into recommendation engine 4 as well, such as magazine subscriptions or library check-out information. User 390, in embodiments, also may set a list of topics.

Recommendation engine 4, in embodiments, may give weight to summaries from content processing cloud 320 (or content from the web in general) according to the inputs from user profile 308 and weighted keywords 3104. Content processing cloud 320 may include a number of servers to collect and store summaries generated by various content processing engines 10. The summaries from content processing cloud 320 may be collected from other users, where the summarization process disclosed above was done on these articles and saved to cloud 320. In embodiments, weight may be given to summaries that include keywords similar to the current keywords. In embodiments, weight also may be given to summaries that include keywords found in user profile 308. The various weights may be initially given on an empirical basis, and subsequently refined based on feedback on the usefulness of the recommendations.

Recommendation engine 4, in embodiments, also may use other factors or characteristics to assign weight to summaries. Thus, recommendation engine 4 may associate sex based weight 3122 to summaries. It also may associate location based weight 3124 to summaries. Recommendation engine 4 also may associate AGE-group based weight 3126 and content based weight 3128 to summaries. Current keywords based weight 3129 may be associated as well.

In embodiments, recommendations may of two types. 1. User biased summaries of the article he is reading, or 2. Article Push.

1. User Biased summaries of the article he is reading:

Attributes from user profiles can become helpful when tailor made summaries are generated for users where inputs of their interest graphs, location, reading interests, reading history and patterns are used along with the data to be summarized. For example, a user from Boston reading an article about winter storm 'Nemo' hitting USA, will be more interested in its effect over Boston rather than New York. Based on the user profile, tailor made summary can be generated such that from the article the user get more information on Boston and less information on New York. As a further example, if there is an article about soccer featuring Manchester United & Chelsea, Manchester United based inclined summary can be generated based on user's interest graph reading habits and history usage as he has been reading more about Manchester United. Also if somebody is reading about Ronaldo which changed a team from Manchester United to Real Madrid, for an article which contains information about Chelsea, Real Madrid and Ronaldo, the user may be provided with more info about Real Madrid than Chelsea as the factor of Ronaldo changing the team may be taken into account.

2. Article Push:

Based on the articles which the user is reading, similar articles can be pushed based on his interest level and browsing history (user profile) and also what people of similar interest are reading.

Aggregator 328, in embodiments, may aggregate the weight of the summaries to give rank to the summaries within recommendation engine 4. Based on these rankings, recommendations 330 may be provided to user 390. Thus, recommendation engine 4 may use summaries from user 390 and other users to provide quality recommendations for reading/viewing. This process may be dynamic as user 390 reads/views more and the summarization process is performed on articles. The information in user profile 308 may be ever changing.

Figure 4:
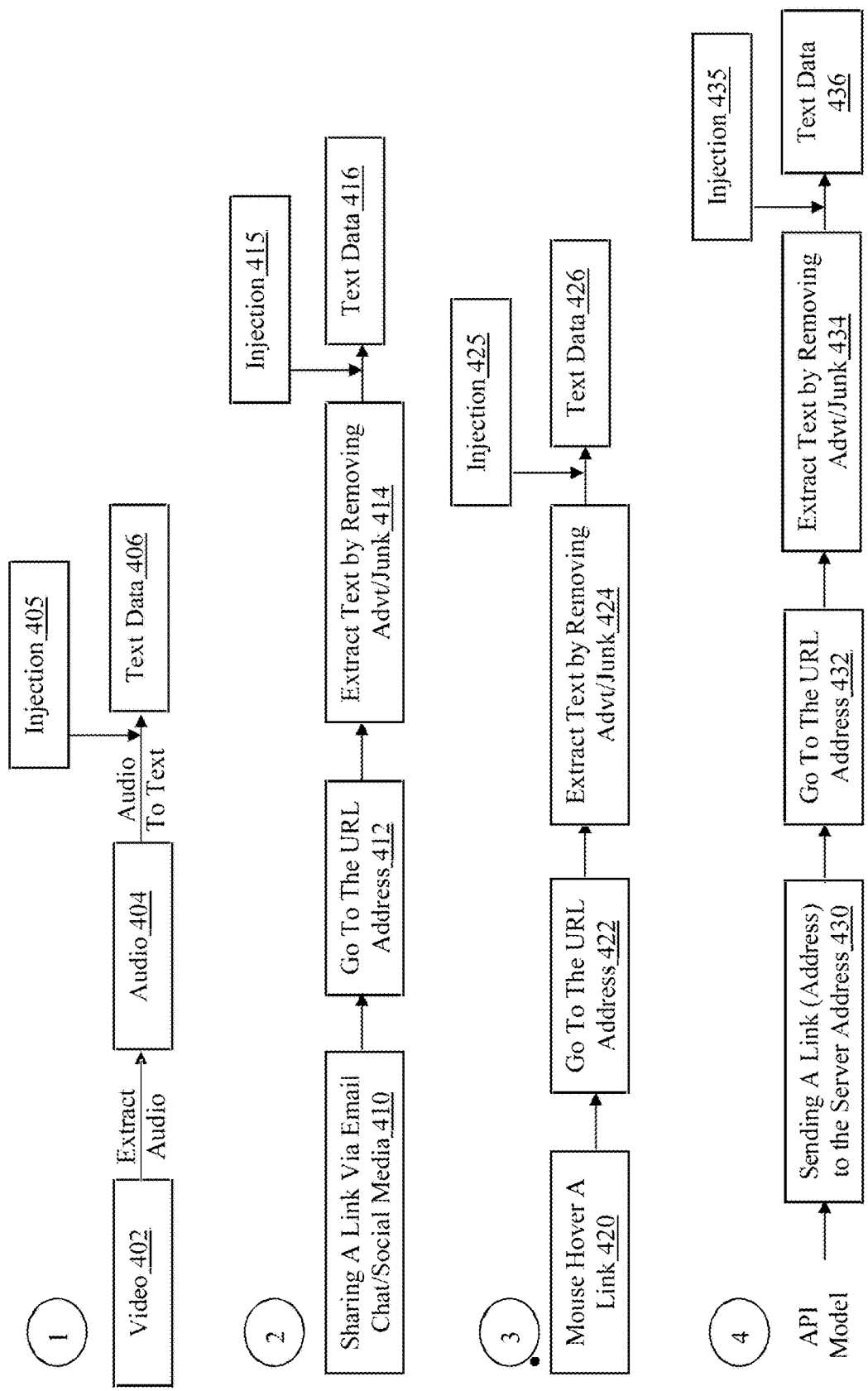
FIGS. 4 and 5 illustrate example input-output processes according to the disclosed embodiments.
Figure 5:
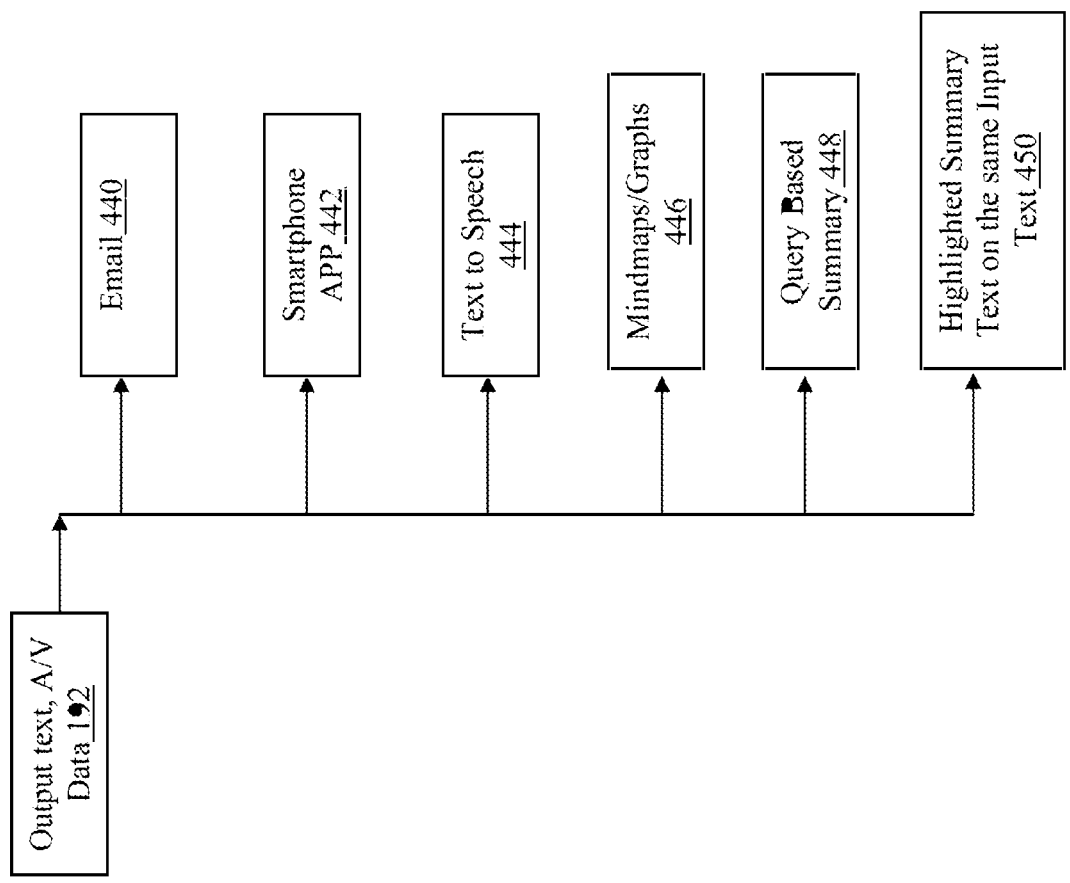

Referring now to FIGS. 4 and 5, wherein example input-output processes according to the disclosed embodiments, are depicted. FIG. 4 depicts example processes to retrieve text data for use in summarization engine 2 of content processing engine 10 according to the disclosed embodiments. In embodiments, the user, such as user 390, may not read a straight text articles on a webpage, and the text may need to be retrieved so as to determine keywords and give weight to the information viewed by the user.

Method 1 of FIG. 4 may include operations 402-406. Operation 402 may include reviewing or retrieving a video file. Operation 404 may include extracting the audio portion of the video. Operation 406 may include converting the audio file into a text file, for input into summarization engine 2. Operation 405 may include injecting information from user profile 308 into the retrieved text data. In embodiments, operations 404-406 may include doing the same for timed captions of the video.

Method 2 of FIG. 4 may include operations 410-416. Operation 410 may include the user sharing a link via email, chat, social media and the like. Operation 412 may include going to the URL address for the link, possibly using a web browser. Operation 414 may include extracting text data from the information at the URL address by removing advertisements and junk information. Thus, banner ads and clutter may be excluded from the summarization processes. Operation 416 may include providing the text data to summarization engine 2. Operation 415 may include injecting information from user profile 308 into retrieving the text data.

Method 3 of FIG. 4 may include operation 420-426. Operation 420 may include having a mouse move a cursor over a link, or to hover over a link. Operation 422 may include going to the URL address of the link. Operation 424 may include extracting text from the online content from the information at the URL address by removing advertisements and junk information. Operation 426 may include providing the text data to summarization engine 2. Operation 425 may include injecting information from user profile 308 into retrieving the text data.

Method 4 of FIG. 4 may include operations 430-436. Operation 430 may include sending a link address to a server address. Operation 432 may include going to the URL address of the link. Operation 434 may include extracting text from the online content from the information at the URL address by removing advertisements and junk information. Operation 436 may include providing the text data to summarization engine 2. Operation 435 may include injecting information from user profile 308 into retrieving the text data.

Thus, using methods 1-4 of FIG. 4, the disclosed embodiments may retrieve and extract text data that is available via text feed/database/local location for analysis by content processing engine 10. This additional information may provide better keywords and data for user profile 308 as well as better recommendations from recommendation engine 4. Further, keywords may be provided for webpages of URL addresses having a mix of data, and not just straight online articles.

FIG. 5 shows example output options for outputting text data from content processing engine 10. The results of the summarization process (extracted text and/or segments of audios/videos) and weighting disclosed above may be sent via email in operation 440, or to a smartphone application in operation 442. Alternatively, the output text data 192 may be sent via text message, whereas output audio/video data 192 may be sent as multi-media messages. Operation 444 may convert the output text data 192 to speech. Mindmaps/graphs may be output in operation 446. A query-based summary may be output in operation 448. Another output 450 may be highlighted summary text on the same input text. This matches up with text of interest. Thus, output data 192 may be displayed or presented to the user in a plurality of different ways, such as a highlight summary on the page so as not to interrupt the user's reading experience, stringed together audio/video segments.

Figure 6:
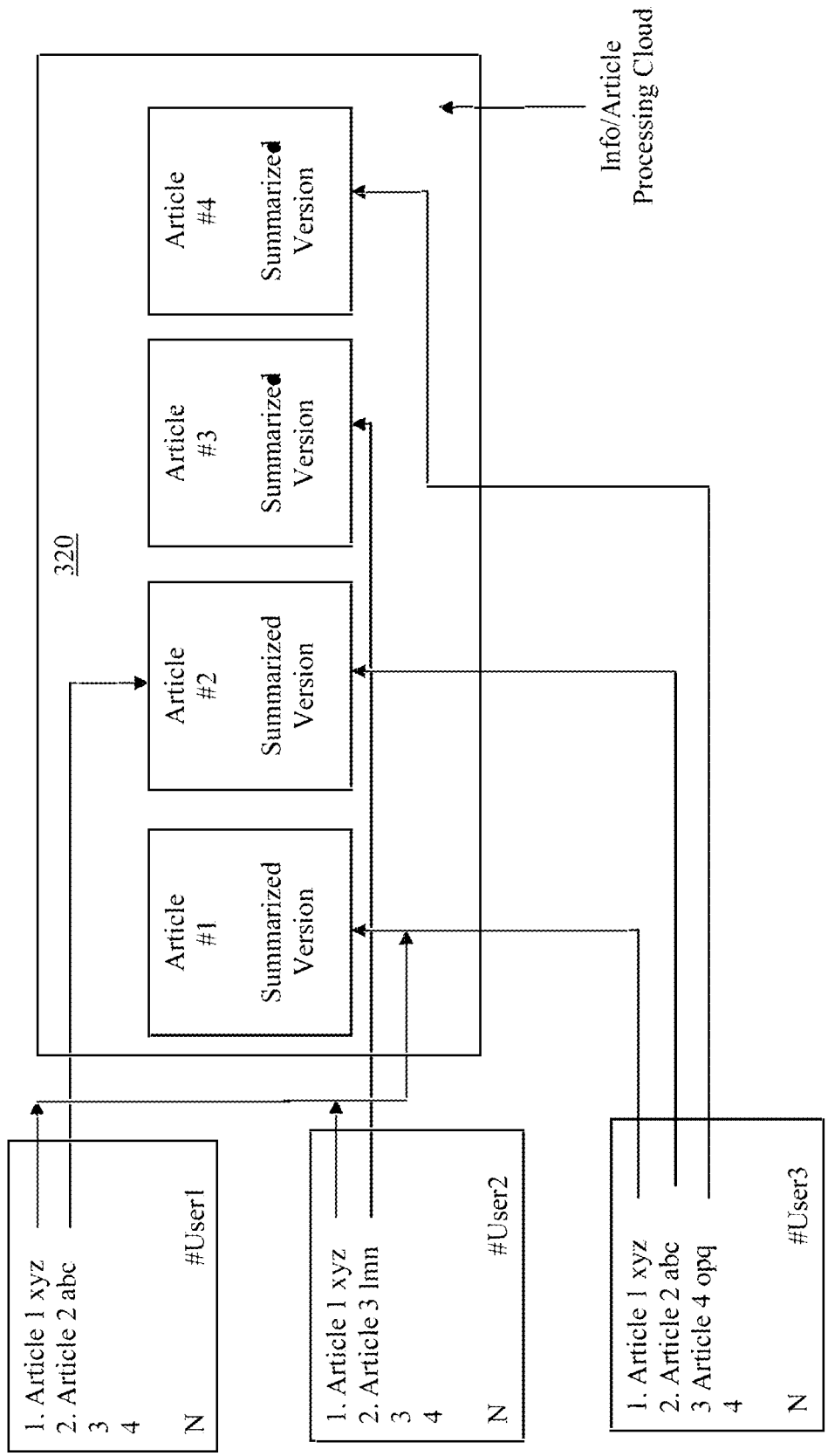
FIG. 6 illustrates a block diagram of articles being saved onto content processing servers in the cloud according to the disclosed embodiments.

Referring now to FIG. 6, wherein a block diagram of articles being saved onto content processing cloud 320 according to the disclosed embodiments, is depicted. As shown in FIG. 3, articles and summaries from cloud 320 may be used in recommending such articles to the user. Recommendation engine 4 may serve as an artificial brain to search the articles for ones that are of interest. This process may alleviate the need for the user to review each and every online article, which has a number increasing exponentially. There is no way one can review every link and article when a search engine returns 2000 hits on a subject.

Cloud 320, e.g., may have articles 1-4 stored, which are summarized versions of the actual articles read by users 1, 2 and 3. As users 1-3 read articles 1-4, the summaries may be generated according to the disclosed embodiments, described earlier. These summaries 1-4 may be saved to cloud 320.

For example, users 1-3 may have read article 1, and the articles summarized to generate keywords xyz. These results may be stored in summarized article 1. User 1 and 3 may have read article 2, and then use the disclosed embodiments to generate keywords abc, which are stored in summarized article 2. User 2 does not read article 2, so no results are generated by the content processing engine 10 of user 2. User 2, instead, may have read article 3, which resulted in the generation of keywords 1 mn, which is stored in summarized article 3 on cloud 320. User 3 does the same for article 4.

The stored results may be used in recommending articles. For example, if user 1 reads article 1 and generates keywords xyz, then article 1 may be recommended to user 3, who has a profile indicating interest in keywords xyz. This saves user 3 the time of reviewing numerous articles, or possibly overlooking article 1 for whatever reason.

As a result, online content and articles may be made manageable using content processing engine 10. Further, good solid recommendations can be made using content processing engine 10 and cloud 320.

Figures 7, 8:
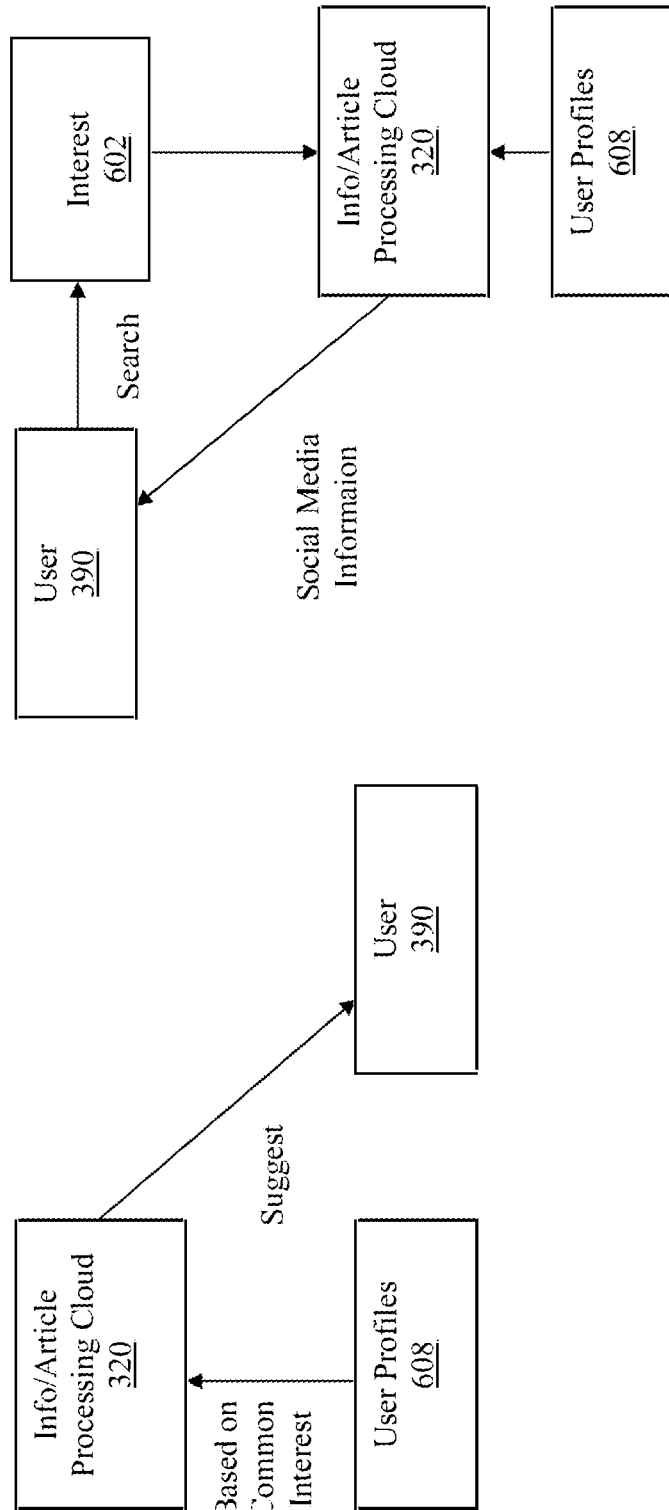
FIGS. 7 and 8 illustrate the use of the content processing cloud environment with a social networking feature according to the disclosed embodiments.

Referring now to FIGS. 7 and 8, wherein the use of content processing cloud 320 in a social media environment according to the disclosed embodiments, are depicted. Content processing cloud 320 may manage every user's profile using their active and passive interests. Content processing cloud 320 may accumulate these interests and knowledge using the processes and embodiments disclosed above. A social media component may be further provided in the disclosed embodiments of content processing cloud 320 to suggest one user 390 to another user 390 based on their common interests, per their user profiles 608 updated as earlier described.

As shown in FIG. 7, content processing cloud 320 may suggest another user 390 to user 390, based on common interest determined per user profiles 608 The user profiles considered need not be a friend or associate of user 390. The suggestion is based on the common interests between the users 390, determined using user profiles 608.

Alternatively, the reverse process is shown in FIG. 8. User 309 may search for interests 602 on content processing cloud 320. For example, user 309 may perform the search because user 309 wants to develop an interest in an area. Content processing cloud 320 would then suggest other social media information (groups, pages, etc.) to user 309, based on interests stored in user profiles.

For example, one may consider a social network having at least three users-User A, User B and User C, with the following interests:

| User A | User B | User C |
| --- | --- | --- |
| kw-a | kw-a | kw-b |
| kw-c | kw-m | ke-l |
| ke-x | ke-x | ke-n |
| kw-y | kw-n | kw-e |

Thus, content processing cloud 320 would suggest User B to User A based on their common multiple interests (kw-a and ke-x), as determined from their user profiles. User C may not be suggested as there are no common interests identified by the disclosed processes. User A, however, may have User C suggested if he searches for the interest kw-b, that is listed as an interest for User C, per its user profile. Other factors may be considered as well, such as age, sex, location, education, and the like.

In embodiments, a summary of the user preference and behavior information gathered in a user profile may be included with a link shared over a social network, email, text message, or other communication form.

The disclosed embodiments may be supported and executed on a platform/computer system, such as a smartphone, a phablet, a tablet, a laptop, a desktop, and so forth, that has access to a network. The platform/computer system may support software and executable programs to provide the functionality disclosed above. For instance, the software may be deployed. Any software embodying the similar event algorithm and its processes may be deployed by manually loading directly to the client, server and proxy computers via loading a storage medium such a CD, DVD, flash memory, chip, downloadable program and the like. The software also may be automatically or semi-automatically deployed into a computer system by sending the process software to a central server or a group of central servers. The software may also be downloaded into client computers that execute the programs and instructions associated with the software.

Alternatively, the software may be sent directly to the client computers via email. The software may be detached to a directory or loaded into a directory by a button on the email that executes a program that detaches the software into a directory. Another alternative is to send the software directly to a directory on the client computer hard drive. When there are proxy servers, the disclosed embodiments will select the proxy server code, determine on which computers to place the proxy servers' code, transmit the proxy server code, and install the proxy server code on the proxy computer. The software may be transmitted to the proxy server and then stored on the proxy server.

Figure 11:
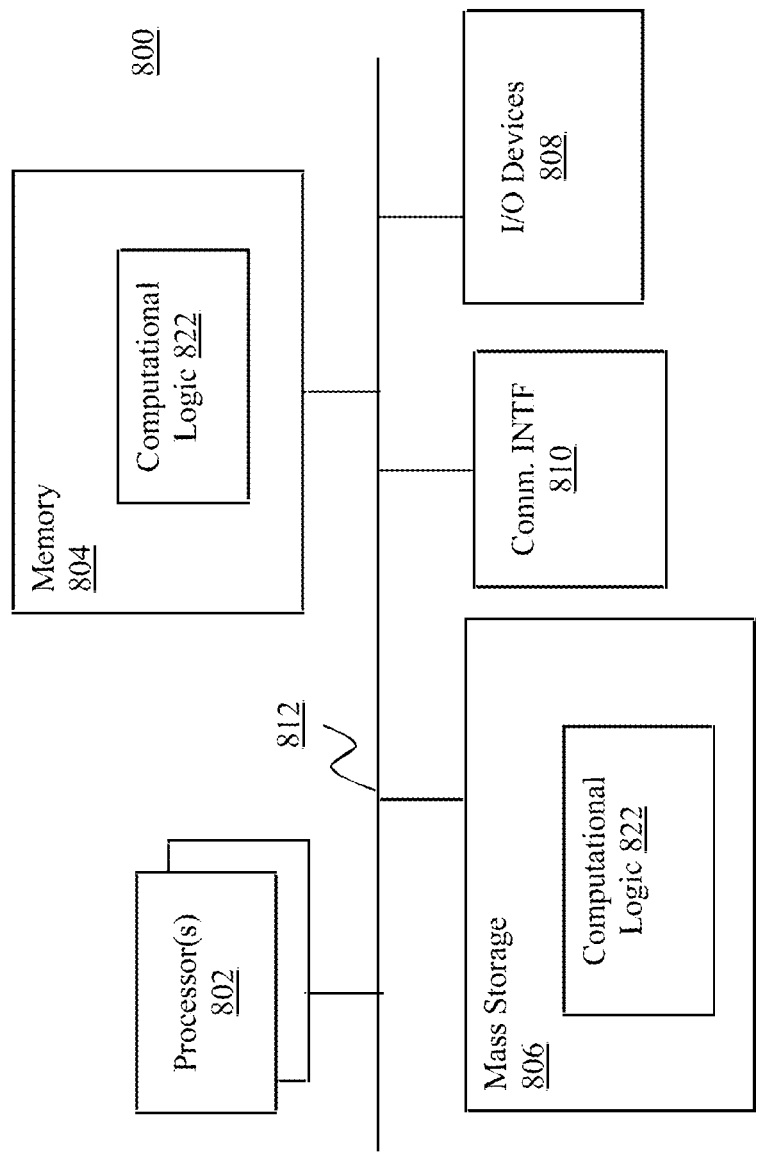
FIG. 11 illustrates an example computer system suitable for use to practice various aspects of the present disclosure, according to the disclosed embodiments.

FIG. 11 illustrates an example computer system that may be suitable for use as a client device or a server to practice selected aspects of the present disclosure. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing the operations associated with summarization engine 2, recommendation engine 4, and/or user preference learning module 304, earlier described, collectively referred to as computational logic 822. The various elements may be implemented by assembler instructions supported by processor(s) 802 or high-level languages, such as, for example, C, that can be compiled into such instructions.

In some implementations, such as when the computer 800 is a server (or a cluster of servers), the processor(s) 802 may include one or more hardware accelerators. The hardware accelerators may be microprocessors, configurable hardware (e.g., field programmable gate arrays (FPGAs), programmable application specific integrated circuits (ASICs), programmable System-on-Chips (SoCs), digital signal processors (DSPs), etc.), or some other suitable special-purpose processing device tailored to perform one or more specific tasks or workloads, for example, specific tasks or workloads of the subsystems of the Info/Article Processing Engine 10 discussed previously. In some embodiments, the specific tasks or workloads may be offloaded from one or more application processors to the hardware accelerators. In FPGA-based implementations, the circuitry of the hardware accelerators may comprise logic blocks or logic fabric including and other interconnected resources that may be programmed (e.g., configured) to perform various functions, such as the procedures, methods, functions, etc., of the various embodiments discussed herein. Additionally, in these FPGA-based implementations the processor(s) 802, memory 804, and/or mass storage 806 may include memory cells (e.g., EPROM, EEPROM, flash memory, static memory (e.g., SRAM, anti-fuses, etc.) used to store logic blocks, logic fabric, data, etc. in LUTs and the like.

In some embodiments, the processor(s) 802 may be embodied by (or as) or otherwise include hardware elements specifically tailored for artificial brain and/or AI/ML (e.g., NN) functionality, such as for operating the subsystems of the content processing engine 10 discussed previously with regard to FIGS. 1-10. In some implementations, the processor(s) 802 may be, or may include, a high-performance computing engine configurable to operate an artificial brain and/or various NNs. In some implementations, the processor(s) 802 may be, or may include, an AI engine chip, one or more AI accelerators and/or AI accelerating co-processor(s), neural compute stick(s), neuromorphic hardware, an arrangement of Graphics Processing Units (GPUs), one or more CPUs, one or more FPGAs, one or more SoCs, one or more DSPs, one or more AI-dedicated ASICs, and/or other forms of specialized circuitry that can run many different kinds of AI instruction sets once loaded with the appropriate weightings, biases, and training data/code. In such implementations, the AI engine chip, AI accelerators, etc., may be designed for hardware acceleration of AI applications, such as one or more of engines/subsystems of the content processing engine 10. In any of the aforementioned embodiments and implementations, the processor(s) 802, hardware accelerators, and/or other forms of specialized processors or circuitry are designed to accomplish one or more specialized tasks. The specialized tasks may include AI processing (e.g., ML training, ML optimization/learning, inferencing, classification, etc.) operations, visual data processing, network data processing, object detection, rule analysis, content processing operations (e.g., article/document summarization operations of the summarization engine 4 and recommendation operations of the recommendation engine 4), and/or the like.

The number, capability and/or capacity of these elements 810-812 may vary, depending on whether computer 800 is used as a client device or a server. When use as client device, the capability and/or capacity of these elements 810-812 may vary, depending on whether the client device is a stationary or mobile device, like a smartphone, computing tablet, ultrabook or laptop. Otherwise, the constitutions of elements 810-812 are known, and accordingly will not be further described.

Figure 12:
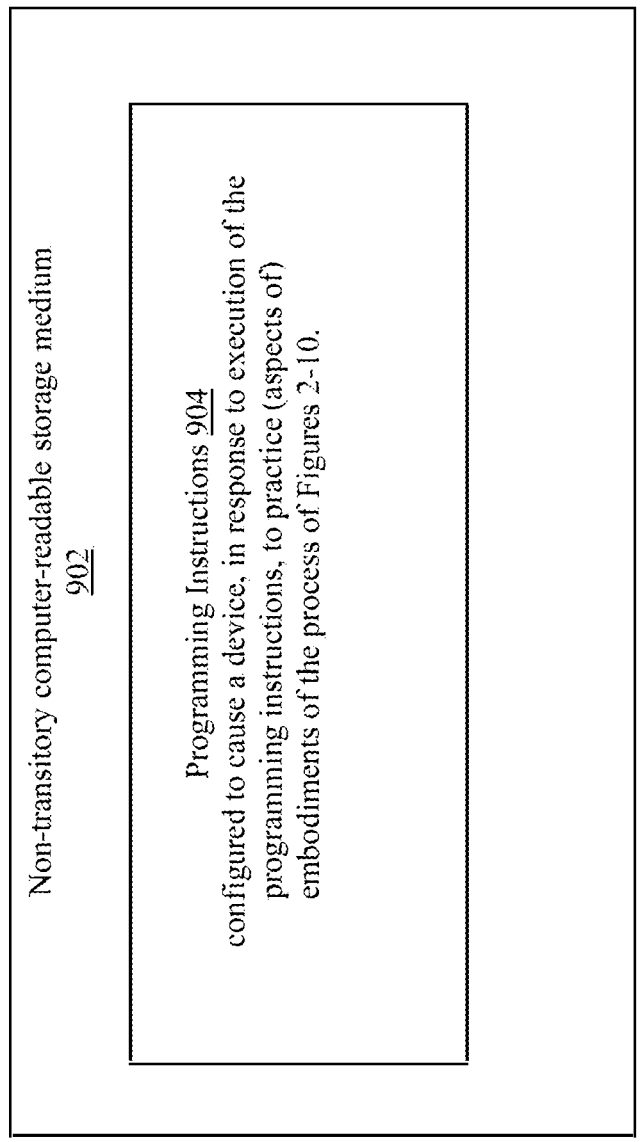
FIG. 12 illustrates a storage medium having instructions for practicing methods described with references to FIGS. 2-10, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computer 800, in response to execution of the programming instructions, to perform, e.g., various operations associated with summarization engine 2, recommendation engine 4 and/or user preference learning module 304. In alternate embodiments, programming instructions 904 may be disposed on multiple computer-readable non-transitory storage media 902 instead. In alternate embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 8, for one embodiment, at least one of processors 802 may be packaged together with memory having computational logic 822 (in lieu of storing on memory 804 and storage 806). For one embodiment, at least one of processors 802 may be packaged together with memory having computational logic 822 to form a System in Package (SiP). For one embodiment, at least one of processors 802 may be integrated on the same die with memory having computational logic 822. For one embodiment, at least one of processors 802 may be packaged together with memory having computational logic 822 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may include an apparatus for processing or recommending content. The apparatus may include a content processing engine to process content, that includes a summarization engine. The summarization engine may be configured to score constituent parts of the content, and to generate a plurality of summaries from a plurality of points of view for the content, based at least in part on the scores of constituent parts. At least one of the summaries may be formed with constituent parts extracted from the contents.

Example 2 may include the subject matter of example 1. The content may include online or offline webpages, articles, audio or video. At least one of the summaries of a textual article may include extracted sentences of the textual articles; and at least of summaries of an audio/video content may include extracted segments of the audio/video content.

Example 3 may include the subject matter of example 1 and/or 2. The summarization engine may provide a rank to each sentence of a content having constituent parts that are sentences, based on coherence of roots of words between sentences of the content, and determine a relation how each sentence of the content is connected with another sentence of the content.

Example 4 may include the subject matter of any one of examples 1-3. The summarization engine may determine title words and key phrases using term frequency-inverse domain frequency for each word of a sentence of a content having constituent parts that are sentences.

Example 5 may include the subject matter of any one of examples 1-4. The summarization engine may tag all nouns of the content, link all tagged nouns with verbs, adjectives and adverbs of the content, and index relationships between the nouns based at least in part on the links.

Example 6 may include the subject matter of any one of examples 1-5. The summarization engine may score sentences of a content heuristically, for contents with constituent parts that are sentences, including scoring sentences based at least in part on location, cardinal and indicational heuristics.

Example 7 may include the subject matter of any one of examples 1-6. The summarization engine may further selectively output the summaries for a user, based at least in part on a point of view of interest to the user.

Example 8 may include the subject matter of any one of examples 1-7. The content processing engine may further include a recommendation engine coupled with the summarization engine to rank summaries output by the summarization engine, based at least in part on information in a user profile of a user to receive recommendation from the recommendation engine, and recommend content to the user based at least in part on the ranked summaries.

Example 9 may include the subject matter of example 8. The recommendation engine may associate sex, location, age group, content or current keyword based weights to summaries, based at least in part on respective sex, location, age group, content or current keyword information in the user profile of the user to receive recommendation from the recommendation engine, wherein the content information includes content reading behavior information of the user.

Example 10 may include the subject matter of example 8 or 9. The content processing engine may further include a user preference learning module to input information used by the recommendation engine into the user profile.

Example 11 may include the subject matter of example 10. The user preference learning module may receive keywords, associate weight to the keywords, based at least in part on user-driven summary, frequency domain, time line domain, or user feedback, and rank the keywords.

Example 12 may include the subject matter of example 10 or 11. The user preference learning module may also provide a summary of user preferences and behavior in the user profile for inclusion with a link to be shared over a social network, via email or text message.

Example 13 may include subject matter of any one of examples 1-12. The content processing engine may further selective output the plurality of summaries of the plurality of points of view to a user, including highlighting constituent parts of an output, based at least in part on a point of view of the output.

Example 14 may include subject matter of any one of examples 1-13. The content processing engine may further store the plurality of summaries of the plurality of points of view in servers of a content processing cloud environment.

Example 15 may include the subject matter of example 14. The content processing cloud environment may suggest a first user to a second user of a social network based at least in part on common interest inferred from user profiles of the first and second users, wherein the user profiles include content reading behavior information of the first and second users.

Example 16 may include the subject matter of example 14 or 15. The content processing cloud environment may suggest social media information to a first user of a social network, engaged in a search for information about an interest, based at least in part on information of a plurality of user profiles. The user profiles may include content reading behavior information of users.

Example 17 may include the subject matter of any one of examples 1-16. The apparatus may be a selected one of a smartphone, a phablet, a computing tablet, a laptop computer, a desktop computer or a game console.

Example 18 may be an apparatus for processing or recommending content. The apparatus may include a recommendation engine to rank summaries output by a summarization engine, based at least in part on information in a user profile of a user to receive recommendation from the recommendation engine, and recommend content to the user based at least in part on the ranked summaries. The recommendation engine may associate sex, location, age group, content or current keyword based weights to summaries, based at least in part on respective sex, location, age group, content or current keyword information in the user profile of the user to receive recommendation from the recommendation engine. The content information may include content reading behavior information of the user.

Example 19 may include the subject matter of example 18. The content processing engine may further include a user preference learning module to input information used by the recommendation engine into the user profile.

Example 20 may include the subject matter of example 19. The user preference learning module may receive keywords, associate weight to the keywords, based at least in part on user-driven summary, frequency domain, time line domain, or user feedback, and rank the keywords.

Example 21 may include the subject matter of example 20. The user preference learning module may also provide a summary of user preferences and behavior in the user profile for inclusion with a link to be shared over a social network, via email or text message.

Example 22 may be an apparatus for processing or recommending content. The apparatus may include a user preference learning module to input information into a user profile of a user to receive recommendations from a recommendation engine. The recommendation engine may provide recommendation based at least in part on keyword information in the user profile, wherein the user preference learning module to receive keywords, associate weight to the keywords, based at least in part on user-driven summary, frequency domain, time line domain, or user feedback, and rank the keywords.

Example 23 may include the subject matter of example 22. The user preference learning module to also provide a summary of user preferences and behavior in the user profile for inclusion with a link to be shared over a social network, via email or text message.

Example 24 may be an apparatus for processing or recommending content. The apparatus may include one or more servers to form a content processing cloud environment to receive a plurality of summaries of the plurality of points of view, from a plurality of content processing engines, and store the plurality of summaries of the plurality of points of view for use by recommendation engines to make content recommendations to users based at least in part on information in user profiles of users to receive recommendation. The content processing cloud environment may further suggest a first user to a second user of a social network based at least in part on common interest inferred from user profiles of the first and second users. The user profiles may include content reading behavior information of the first and second users.

Example 25 may include the subject matter of example 24. The content processing cloud environment may suggest social media information to a first user of a social network, engaged in a search for information about an interest, based at least in part on information of a plurality of user profiles, wherein the user profiles include content reading behavior information of users.

Example 26 may be a method for processing or recommending content. The method may include processing content by a computing system. Processing content may include scoring, by the computing system, constituent parts of the content, and generating, by the computing system, a plurality of summaries from a plurality of points of view for the content, based at least in part on the scores of constituent parts. At least one of the summaries is formed with constituent parts extracted from the contents.

Example 27 may include the subject matter of example 26. The content may include online or offline webpages, articles, audio or video. At least one of the summaries of a textual article may include extracted sentences of the textual articles; and at least one of the summaries of an audio/video content may include extracted segments of the audio/video content.

Example 28 may include the subject matter of example 26 or 27. Scoring may include providing a rank to each sentence of a content having constituent parts that are sentences, based on coherence of roots of words between sentences of the content, and determining a relation how each sentence of the content is connected with another sentence of the content.

Example 29 may include the subject matter of any one of examples 26-28. Scoring may include determining title words and key phrases using term frequency-inverse domain frequency for each word of a sentence of a content having constituent parts that are sentences.

Example 29 may include the subject matter of any one of examples 26-29. Scoring may include tagging all nouns of the content, link all tagged nouns with verbs, adjectives and adverbs of the content, and indexing relationships between the nouns based at least in part on the links.

Example 31 may include the subject matter of any one of examples 26-30. Scoring may include scoring sentences of a content heuristically, for contents with constituent parts that are sentences, including scoring sentences based at least in part on location, cardinal and indicational heuristics.

Example 32 may include the subject matter of any one of examples 26-31., The method may further selectively outputting, by the computing system, the summaries for a user, based at least in part on a point of view of interest to the user.

Example 33 may be a method for processing or recommending content. The method may include ranking, by a computing system, summaries output by a summarization process, based at least in part on information in a user profile of a user to receive recommendation, and recommending content to the user based at least in part on the ranked summaries. Ranking may include associating sex, location, age group, content or current keyword based weights to summaries, based at least in part on respective sex, location, age group, content or current keyword information in the user profile of the user to receive recommendation. The content information may include content reading behavior information of the user.

Example 34 may include the subject matter of example 33. The method may further includes inputting, by the computing system, information used by the recommendation into the user profile.

Example 35 may include the subject matter of example 34. Inputting may include receiving keywords, associate weight to the keywords, based at least in part on user-driven summary, frequency domain, time line domain, or user feedback, and ranking the keywords.

Example 36 may include the subject matter of example 35. The method may further include providing, by a computing system, a summary of user preferences and behavior in the user profile for inclusion with a link to be shared over a social network, via email or text message.

Example 37 may be a method for processing or recommending content. The method may include inputting, by a computing system, information into a user profile of a user to receive recommendations. The recommendations may be based at least in part on keyword information in the user profile. Inputting comprises receiving keywords, associating weight to the keywords, based at least in part on user-driven summary, frequency domain, time line domain, or user feedback, and ranking the keywords.

Example 38 may include the subject matter of example 37. The method may further include providing, by the computing system, a summary of user preferences and behavior in the user profile for inclusion with a link to be shared over a social network, via email or text message.

Example 39 may be a method for processing or recommending content. The method may include receiving, by one or more servers of a content processing cloud environment, a plurality of summaries of the plurality of points of view, from a plurality of content processing engines, and storing the plurality of summaries of the plurality of points of view for use by recommendation engines to make content recommendations to users based at least in part on information in user profiles of users to receive recommendation; and suggesting, by the one or more servers, a first user to a second user of a social network based at least in part on common interest inferred from user profiles of the first and second users, wherein the user profiles include content reading behavior information of the first and second users.

Example 40 may include the subject matter of example 39. The method may further include suggesting, by the one or more servers, social media information to a first user of a social network, engaged in a search for information about an interest, based at least in part on information of a plurality of user profiles. The user profiles may include content reading behavior information of users.

Example 41 may be one or more storage medium that includes instructions to cause a computing system, in response to execution of the instructions by the computing system, to perform any one of the methods of examples 26-40.

Example 42 may be an apparatus having one or more means for performing any one of the methods of examples 26-40.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A client computer for use in processing content data, the client computer being configurable to communicate with a remote server system via a network, the client computer comprising:
   network communication modem hardware configurable for use in association with data communication with the remote server system via the network;
   programmable system-on-chip (SOC) comprising central processing unit (CPU) core circuitry and accelerator circuitry, the accelerator circuitry comprising graphics processing unit (GPU) circuitry and neural network accelerator circuitry, the accelerator circuitry to execute artificial intelligence (AI)-related operations and/or machine learning (ML)-related operations, the AI-related operations and/or the ML-related operations to be based upon model data and the content data, the AI-related operations and/or the ML-related operations to result in generation of results data; and
   input/output (I/O) device hardware to generate user output data corresponding, at least in part, to the results data;
   wherein:
     the content data is configurable to comprise one or more of audio data, video data, and/or text data;
     the results data is configurable, based upon user input data, to comprise (1) at least one summary of the content data, and (2) user recommendation data related to the content data;
     the at least one summary is selectable, based upon the user input data, from multiple possible summaries of the content data;
     the multiple possible summaries are different from each other, at least in part;
     the multiple possible summaries correspond, at least in part, to multiple possible manners of user presentation via the input/output (I/O) device hardware;
     in event that the content data comprises the audio data and/or the video data, the at least one summary and/or the recommendation data are configurable to be generated in association with transcription data that corresponds, at least in part, to the audio data and/or the video data;
     the AI-related operations and/or the ML-related operations are associated, at least in part, with determining one or more neural network-associated weights to be used in natural language processing;
     the natural language processing comprises determining one or more key words and/or one or more key phrases to be comprised in the at least one summary;
     the client computer is to provide to the remote server system, via the network, user-associated weight-related data; and
     the user-associated weight-related data is to be combined, by the remote server system, with other user-associated weight-related data for use in association with the natural language processing.

2. The client computer of claim 1, wherein:
   the client computer is to receive program instructions from the remote server system via the network that, when executed by the client computer, results in performance of the AI-related operations and/or the ML-related operations; and
   the client computer comprises a smartphone.

3. The client computer of claim 2, wherein:
   the generation of the results data is associated, at least in part, with text highlighting.

4. The client computer of claim 2, wherein:
   the generation of the results data is associated with one or more of: email data, text message data, document data, and/or multimedia data.

5. The client computer of claim 4, wherein:
   the user output data is to be associated, at least in part, with a smartphone application.

6. The client computer of claim 4, wherein:
   the at least one summary comprises other data extracted and/or abstracted from the content data.

7. The client computer of claim 4, wherein:
   the client computer is to output the user output data as speech.

8. At least one non-transitory computer-readable storage medium storing instructions for being executed by a client computer, the client computer to be used in processing content data, the client computer being configurable to communicate with a remote server system via a network, the client computer comprising network communication modem hardware, a programmable system-on-chip (SOC), and input/output (I/O) device hardware, the programmable SOC comprising central processing unit (CPU) core circuitry and accelerator circuitry, the accelerator circuitry comprising graphics processing unit (GPU) circuitry and neural network accelerator circuitry, the instructions, when executed by the client computer, resulting in the client computer being configured for performance of operations comprising:
   using the network communication modem hardware in association with data communication with the remote server system via the network;
   executing, by the accelerator circuitry, artificial intelligence (AI)-related operations and/or machine learning (ML)-related operations, the AI-related operations and/or the ML-related operations to be based upon model data and the content data, the AI-related operations and/or the ML-related operations to result in generation of results data; and
   generating, using the input/output (I/O) device hardware, user output data corresponding, at least in part, to the results data;
   wherein:
     the content data is configurable to comprise one or more of audio data, video data, and/or text data;
     the results data is configurable, based upon user input data, to comprise (1) at least one summary of the content data, and (2) user recommendation data related to the content data;
     the at least one summary is selectable, based upon the user input data, from multiple possible summaries of the content data;
     the multiple possible summaries are different from each other, at least in part;
     the multiple possible summaries correspond, at least in part, to multiple possible manners of user presentation via the input/output (I/O) device hardware;

in event that the content data comprises the audio data and/or the video data, the at least one summary and/or the recommendation data are configurable to be generated in association with transcription data that corresponds, at least in part, to the audio data and/or the video data;

the AI-related operations and/or the ML-related operations are associated, at least in part, with determining one or more neural network-associated weights to be used in natural language processing;

the natural language processing comprises determining one or more key words and/or one or more key phrases to be comprised in the at least one summary;

the client computer is to provide to the remote server system, via the network, user-associated weight-related data; and the user-associated weight-related data is to be combined, by the remote server system, with other user-associated weight-related data for use in association with the natural language processing.

9. The at least one non-transitory computer-readable storage medium of claim 8, wherein:
the client computer is to receive the instructions, at least in part, from the remote server system via the network; and
the client computer comprises a smartphone.

10. The at least one non-transitory computer-readable storage medium of claim 9, wherein:
the generation of the results data is associated, at least in part, with text highlighting.

11. The at least one non-transitory computer-readable storage medium of claim 9, wherein:
the generation of the results data is associated with one or more of: email data, text message data, document data, and/or multimedia data.

12. The at least one non-transitory computer-readable storage medium of claim 11, wherein:
the user output data is to be associated, at least in part, with a smartphone application.

13. The at least one non-transitory computer-readable storage medium of claim 11, wherein:
the at least one summary comprises other data extracted and/or abstracted from the content data.

14. The at least one non-transitory computer-readable storage medium of claim 11, wherein:
the client computer is to output the user output data as speech.

15. A method implemented, at least in part, using a client computer, the client computer to be used in processing content data, the client computer being configurable to communicate with a remote server system via a network, the client computer comprising network communication modem hardware, a programmable system-on-chip (SOC), and input/output (I/O) device hardware, the programmable SOC comprising central processing unit (CPU) core circuitry and accelerator circuitry, the accelerator circuitry comprising graphics processing unit (GPU) circuitry and neural network accelerator circuitry, the method comprising:
using the network communication modem hardware in association with data communication with the remote server system via the network;
executing, by the accelerator circuitry, artificial intelligence (AI)-related operations and/or machine learning (ML)-related operations, the AI-related operations and/or the ML-related operations to be based upon model data and the content data, the AI-related operations and/or the ML-related operations to result in generation of results data; and
generating, using the input/output (I/O) device hardware, user output data corresponding, at least in part, to the results data;

wherein:
the content data is configurable to comprise one or more of audio data, video data, and/or text data;
the results data is configurable, based upon user input data, to comprise (1) at least one summary of the content data, and (2) user recommendation data related to the content data;
the at least one summary is selectable, based upon the user input data, from multiple possible summaries of the content data;
the multiple possible summaries are different from each other, at least in part;
the multiple possible summaries correspond, at least in part, to multiple possible manners of user presentation via the input/output (I/O) device hardware;
in event that the content data comprises the audio data and/or the video data, the at least one summary and/or the recommendation data are configurable to be generated in association with transcription data that corresponds, at least in part, to the audio data and/or the video data;
the AI-related operations and/or the ML-related operations are associated, at least in part, with determining one or more neural network-associated weights to be used in natural language processing;
the natural language processing comprises determining one or more key words and/or one or more key phrases to be comprised in the at least one summary;
the client computer is to provide to the remote server system, via the network, user-associated weight-related data; and
the user-associated weight-related data is to be combined, by the remote server system, with other user-associated weight-related data for use in association with the natural language processing.

16. The method of claim 15, wherein:
the client computer is to receive program instructions from the remote server system via the network that, when executed by the client computer, results in performance of the AI-related operations and/or the ML-related operations; and
the client computer comprises a smartphone.

17. The method of claim 16, wherein:
the generation of the results data is associated, at least in part, with text highlighting.

18. The method of claim 16, wherein:
the generation of the results data is associated with one or more of: email data, text message data, document data, and/or multimedia data.

19. The method of claim 18, wherein:
the user output data is to be associated, at least in part, with a smartphone application.

20. The method of claim 18, wherein:
the at least one summary comprises other data extracted and/or abstracted from the content data.

21. The method of claim 18, wherein:
the client computer is to output the user output data as speech.

22. A server system configurable to communicate with a client computer via a network, the client computer to be used in processing content data, the client computer comprising programmable system-on-chip (SOC) and input/output (I/O) device hardware, the programmable SOC comprising central processing unit (CPU) core circuitry and accelerator circuitry, the accelerator circuitry comprising graphics processing unit (GPU) circuitry and neural network accelerator circuitry, the accelerator circuitry to execute artificial intelligence (AI)-related operations and/or machine learning (ML)-related operations, the server system comprising:

processor circuitry; and computer-readable storage to store instructions that are to be executed by the processor circuitry, the instructions, when executed by the processor circuitry, resulting in performance of operations comprising:

transmitting, via the network, program instructions to the client computer that are to be executed by the client computer, the program instructions, when executed by the client computer, resulting in performance of the AI-related operations and/or the ML-related operations, the AI-related operations and/or the ML-related operations to be based upon model data and the content data, the AI-related operations and/or the ML-related operations to result in generation of results data, the I/O device hardware to generate user output data corresponding, at least in part, to the results data;

wherein:

the content data is configurable to comprise one or more of audio data, video data, and/or text data;

the results data is configurable, based upon user input data, to comprise (1) at least one summary of the content data, and (2) user recommendation data related to the content data;

the at least one summary is selectable, based upon the user input data, from multiple possible summaries of the content data;

the multiple possible summaries are different from each other, at least in part;

the multiple possible summaries correspond, at least in part, to multiple possible manners of user presentation via the input/output (I/O) device hardware;

in event that the content data comprises the audio data and/or the video data, the at least one summary and/or the recommendation data are configurable to be generated in association with transcription data that corresponds, at least in part, to the audio data and/or the video data;

the AI-related operations and/or the ML-related operations are associated, at least in part, with determining one or more neural network-associated weights to be used in natural language processing;

the natural language processing comprises determining one or more key words and/or one or more key phrases to be comprised in the at least one summary;

the server system is to receive from the client computer, via the network, user-associated weight-related data; and the user-associated weight-related data is to be combined, by the server system, with other user-associated weight-related data for use in association with the natural language processing.

23. The server system of claim 22, wherein:
the client computer comprises a smartphone.

24. The server system of claim 23, wherein:
the generation of the results data is associated, at least in part, with text highlighting.

25. The server system of claim 23, wherein:
the generation of the results data is associated with one or more of: email data, text message data, document data, and/or multimedia data.

26. The server system of claim 25, wherein:
the user output data is to be associated, at least in part, with a smartphone application.

27. The server system of claim 25, wherein:
the at least one summary comprises other data extracted and/or abstracted from the content data.

28. The server system of claim 25, wherein:
the client computer is to output the user output data as speech.

* * * * *